No. 892,022. PATENTED JUNE 30, 1908.
A. W. BALL.
PROCESS FOR PREPARING HEMOSTATIC DRESSING.
APPLICATION FILED MAR. 18, 1907.
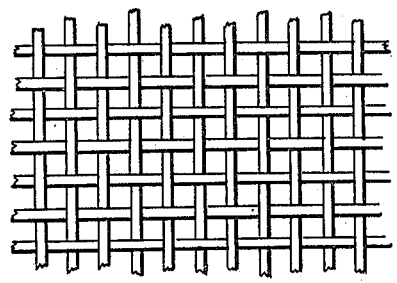
Fig:1.
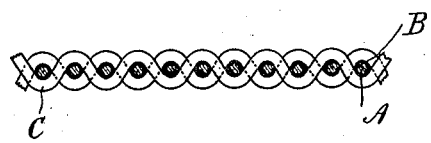
Fig:2.
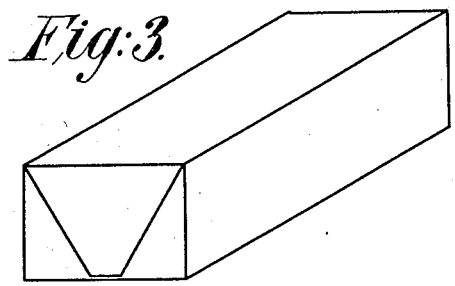
Fig:3.
Witnesses
Edwin D. Bartlett
Walter G. H. Hook
Inventor
Arthur Wilson Ball
per Herbert Lifton Jones
Attorney.

UNITED STATES PATENT OFFICE.

ARTHUR WILSON BALL, OF LONDON, ENGLAND.

PROCESS FOR PREPARING HEMOSTATIC DRESSING.

No. 892,022.

Specification of Letters Patent.

Patented June 30, 1908.

Application filed March 18, 1907. Serial No. 363,010.

*To all whom it may concern:*

Be it known that I, ARTHUR WILSON BALL, a subject of the King of Great Britain, residing at 179 Queen Victoria street, in the city and county of London, England, have invented a new and useful Improvement in Processes for Preparing Hemostatic Dressing, of which the following is a specification.

My invention relates to improvement in the application of hemostatics derived from the suprarenal glands of any animal for the purpose of stopping external hemorrhage by contraction of the small blood vessels.

The method hitherto employed for the application of the suprarenal glands has been to dip the dressings into the aqueous solution and apply them wet to the bleeding surfaces. In addition to the danger of collecting septic germs through the exposure of the solution and the dressing to the atmosphere in the wet state, the present procedure has the grave disadvantage that the pressure which it is usually necessary to apply to the dressing forces out the bulk of the liquid which runs away and its effect is lost.

I have devised a method of preparing the dressing with the hemostatic preparation so that while retaining the full efficacy of the freshly prepared solution it can be applied to the wounded surface in a dry state, and thereby exert its entire efficiency at the point of contact notwithstanding any pressure which it may be necessary to apply.

The basis of my dressing consists of the usual cotton wool, gauze or other material or fabric employed for such dressings, and the expressed juice of the suprarenal glands or an aqueous solution of the active principles thereof previously prepared or an alcohol solution or any other solution of the active principles is used for saturating the said materials. The operation of saturating the dressing, material, or fabric employed is conducted in a previously sterilized chamber and the air allowed to come in contact with the solution and the dressing during or after the saturation operations is carefully filtered in the well known manner so as to exclude septic germs. After saturation with the solution the dressing is exposed in a chamber through which is passed by means of a fan a current of sterilized air which dries from the material the excess of moisture, leaving the active principles permeating the tissues of the dressing, thereby insuring the constant application of the actual active ingredients to the bleeding surfaces of the wounds.

A further improvement in the drying of the dressing consists in conducting the drying operation in an atmosphere of hydrogen, whereby not only are septic germs excluded, but any action of the oxygen of the air upon the solution is obviated. When saturated and dried, the dressing may be conveniently compressed by hydraulic or other means and reduced to a package of minimum dimensions much more convenient for transport, especially for army medical service.

In order more fully to set forth my invention, I have illustrated the dressing in the form of a medicated gauze fabric in the accompanying drawing.

Figure 1 shows on an enlarged scale a piece of such medicated gauze in plan view, and Fig. 2 a section thereof. Fig. 3 shows a packet of the dressing compressed, folded and packed in a waterproof paper or the like for sale.

In the sectional view of the fabric shown in Fig. 2, it will be noted that the central warp threads A are shown as composed of a hard cotton core surrounded by a softer material B, which together with the soft weft threads C is adapted to absorb the glandular solution.

What I claim is:—

1. The herein described process for preparing hemostatic dressing, consisting in soaking absorbent material in suprarenal gland extract, and then drying the same in a sterilized atmosphere.

2. The herein described process for preparing hemostatic dressing, consisting in soaking sterilized absorbent material in suprarenal solution, and then drying the same in an aseptic atmosphere of hydrogen gas.

In testimony whereof I have signed my name to this specification in the presence of two subscribing witnesses.

ARTHUR WILSON BALL.

Witnesses:
HENRY BURFORD,
FLORENCE AMELIA PECK.